April 19, 1966 J. J. TIEMANN 3,247,366

FOUR-QUADRANT MULTIPLIER

Filed May 22, 1962

Inventor:
Jerome J. Tiemann,
by Joseph V. Claeys
His Attorney.

United States Patent Office 3,247,366
Patented Apr. 19, 1966

3,247,366
FOUR-QUADRANT MULTIPLIER

Jerome J. Tiemann, Burnt Hills, N.Y., assignor to General Electric Company, a corporation of New York
Filed May 22, 1962, Ser. No. 196,798
7 Claims. (Cl. 235—194)

Figures 1, 2:
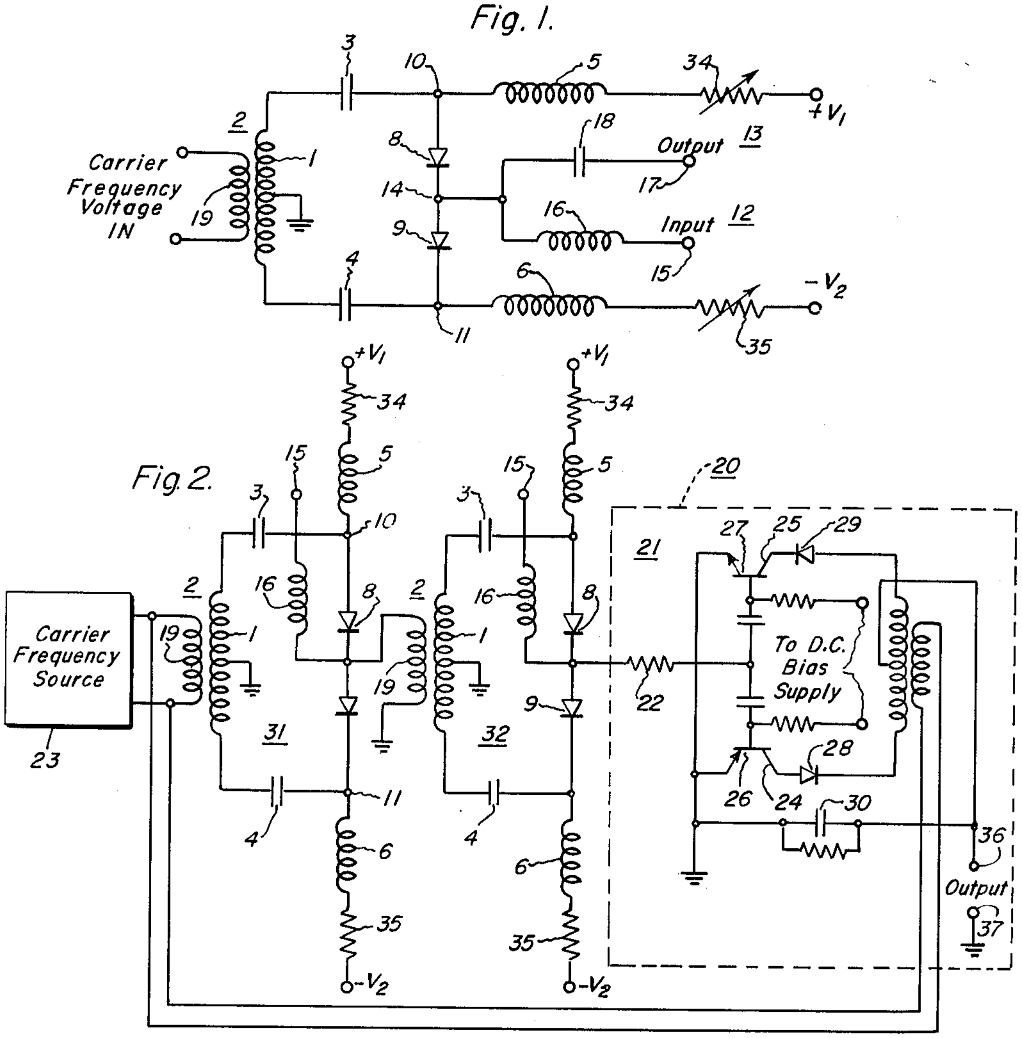

This invention relates generally to devices and systems for performing certain mathematical operations and in particular to such devices and systems for providing the product of a plurality of electrical quantities.

There are a great many electrical and electronic applications which require high speed means for producing a voltage or current which is the product of two or more electrical signals. An ideal multiplier accepts electrical quantities of both signs for the different signals to be multiplied and provides an output which is the product of these signals and has the proper sign as well. Such multiplication, wherein the output has the proper sign for all four possible combinations of signs of the input signals to be multiplied, is known in the art as "four-quadrant multiplication." A common prior art arrangement performs the four-quadrant multiplication by separating the sign information from the magnitudes and utilizing a logic network to determine the sign of the output. The magnitudes are then multiplied by a one-quadrant multiplier and the proper sign, as determined by the logic network, attached to the magnitude of the product. Such prior art high speed multiplier arrangements are very complex and expensive and usually employ many vacuum tubes, or other active circuit elements, and complex interconnecting circuitry. Further, lower cost high speed multipliers known in the art have lacked the accuracy required for a great many important applications.

There are many types of electrical and electronic apparatus, such as analogue computers, data processing equipment and the like, which require large numbers of multipliers. Thus, the cost and complexity of such multipliers are important and serious considerations. Since the multiplier of this invention is inexpensive and combines simple and rugged construction with accurate and efficient operation, it is particularly suitable for applications which require large numbers thereof. This invention has a much wider field of application, however, since it is concerned with the means for producing the true product, including sign, of a plurality of electrical quantities and not particularly with the utilization of the product so produced.

It is an object of this invention, therefore, to provide a new and improved four-quadrant electronic multiplier which substantially avoids one or more of the limitations and disadvantages of the prior art multipliers described.

It is another object of this invention to provide an electronci multiplier which performs four-quadrant multiplication directly.

It is still another object of this invention to provide an electronic four-quadrant multiplier which utilizes conventional circuit components and which is simple, inexpensive and accurate.

It is a further object of this invention to provide a new and improved high speed four-quadrant multiplier circuit which allows a substantial reduction of circuit components over known prior art multiplier circuits of this type. The reduced number of components together with circuit simplicity makes possible significant costs reduction which advantage is greatly increased when great numbers of such circuits are employed in complex equipment such as computers, data processing apparatus, and the like.

Briefly stated, in accordance with one aspect of this invention, a new and improved four-quadrant multiplier for producing an electrical output representative of the product of a plurality of electrical signals comprises a plurality of cascade connected converter means, equal in number to the electrical signals to be multiplied, each capable of developing a carrier frequency output signal from a carrier frequency voltage and a selected input signal. The carrier frequency output is related in phase and amplitude to the polarity and amplitude respectively of the applied input signal. Means are provided for applying one of the plurality of electrical signals to be multiplied to the input of each of the converter means. Means are further provided for detecting the phase and the amplitude of the carrier frequency output signal of the last of the cascade connected converters to obtain the true product, including sign, of the plurality of electrical signals.

The novel features believed characteristic of this invention are set forth with particularity in the appended claims. The invention itself, however, both as to its organization and method of operation, together with further objects and advantages thereof, may best be understood by reference to the following description taken in conjunction with the accompanying drawing wherein like reference numerals indicate the same or similar components and in which:

FIGURE 1 is a schematic circuit diagram of the converter means utilized in the four-quadrant multiplier of this invention, FIGURE 2 is a schematic circuit diagram of a four-quadrant multiplier in accordance with one embodiment of this invention and which is capable of providing the product, including the proper sign, of two electrical signals.

In FIGURE 1 there is shown a schematic circuit diagram of the basic converter means for developing the carrier frequency output signal from the applied carrier frequency voltage and selected input signal. The phase and amplitude of the output of the converter are determined by the polarity and amplitude respectively of the applied input signal. Specifically, this converter means comprises a balanced bridge circuit utilizing a pair of nonlinear circuit elements.

As shown, the converter means comprises a series loop including the secondary winding 1 of a transformer, generally designated as 2, first and second like capacitances 3 and 4, first and second like radio-frequency choke coils 5 and 6, and a voltage source, shown schematically as $+V_1$ and $-V_2$. Secondary winding 1 is center-tapped to a point of reference potential, such as ground.

A pair of series-connected nonlinear circuit elements 8 and 9, preferably having matched electrical characteristics, are connected across the series loop to the junctions 10 and 11 between first and second capacitances and radio-frequency choke coils respectively. In the diagram, nonlinear elements 8 and 9 are shown schematically as diodes, however, it will be understood that other nonlinear devices and elements may be utilized such as for example, semiconductor diodes, barium titanate capacitors, ferrite inductances, soft breakdown diodes in the reverse biased direction, and the like.

Input means 12 and output means 13 are provided which are coupled to the same junction 14 between the two series connected nonlinear elements 8 and 9. Input means 12 includes input terminal 15 and radio-frequency choke coil 16. Output means 13 includes output terminal 17 and capacitance 18.

In operation, the primary winding 19 of transformer 2 is connected to a source of carrier frequency voltage, not shown, which may have either constant or varying amplitude. Since secondary winding 1 is center-tapped, equal and opposite carrier frequency voltages are derived which appear at the like capacitances 3 and 4. Also, in the absence of an input signal to input terminal 15, both diodes 8 and 9 have the same applied bias voltage. Thus, when both diodes 8 and 9 have been chosen to have matched electrical characteristics, they present the same impedance to the carrier frequency voltage and, by the symmetry of the circuit, there is zero output at output means 13. When nonlinear elements 8 and 9 do not have matched electrical characteristics, resistances 34 and 35 may be provided whose relative values are chosen to provide that the bias applied to the respective nonlinear elements results in each element presenting substantially the same impedance to the carrier frequency signal. Alternatively, the tap on winding 1 can be moved away from the center so that the radio-frequency voltages at points 10 and 11 are in the same ratio as the impedances of elements 8 and 9. Under these conditions there is again zero output voltage with no input signal present at input means 12.

A positive electrical signal to input terminal 15, however, reduces the bias voltage on diode 9 and increases the bias voltage on diode 8. This change in bias on the diodes unbalances the impedances thereof causing a carrier frequency output voltage to appear at terminal 17 of output means 13. This output is substantially proportional to the amplitude of the electrical signal applied to input terminal 15. In addition, the phase of this output with respect to the phase of the carrier frequency signal applied to winding 19 is determined by the polarity of the electrical signal applied to input terminal 15. Thus, by circuit symmetry, a negative polarity electrical signal to input terminal 15 causes a carrier frequency output voltage to appear at output terminal 17 which is of the opposite phase to that produced by an input signal of positive polarity.

The converter means illustrated in FIGURE 1, therefore, develops a carrier frequency output whose amplitude is proportional to the second electrical input signal including sign. For example, an output of one phase represents an input signal of one polarity and an output of the opposite phase represents an input signal of opposite polarity. The circuit thus, multiplies the carrier frequency voltage, applied to the primary winding of transformer 2, by the electrical signal impressed on input means 12. If the alternating current input to the primary of transformer 2 changes its value the carrier frequency output voltage varies in direct proportion. To obtain the product of two or more inputs, therefore, a number of the converter means, equal to the number of electrical input signals to be multiplied, are interconnected in cascade relationship with respect to the carrier frequency signals.

A four-quadrant multiplier capable of producing the product of two electrical signals is shown in FIGURE 2 and includes in cascade two of the basic converter circuits of FIGURE 1 and a phase sensitive detector. Although for simplicity only two such converter circuits are shown connected in cascade to provide a two input multiplier, it will be understood that as many such cascaded circuits may be employed as there are signals to be multiplied with the final cascaded circuit being a phase sensitive detector.

The phase sensitive detector, shown generally by the block 20 in FIGURE 2, converts a carrier frequency input signal to a direct current voltage whose polarity is determined by whether the input signal is in or out of phase with an applied reference carrier frequency signal voltage. A wide variety of circuit arrangements are suitable for this purpose and may be conveniently a circuit such as shown schematically at 21 within the block 20.

As shown, the output of the last converter means is applied through resistance 22 to phase sensitive detector 21. The reference phase derived from carrier frequency source 23 is inductively coupled to collector electrodes 24 and 25 of opposite type transistors 26 and 27 respectively. For example, transistor 26 may be of PNP-type while transistor 27 may be of NPN-type as shown. For simplicity of explanation it will be convenient to view the reference voltage applied to these transistors as a collector bias supply voltage.

In operation, during one half cycle, designated the active half cycle, the polarity of the collector voltage is of the proper polarity to obtain transistor action. During the other half cycle, the voltage is blocked by the diodes 28 and 29 in series with the collector leads. The base electrodes of transistors 26 and 27 have a bias voltage applied thereto which is adjusted so that in the absence of a signal at the base leads applied through resistance 22 the transistors conduct equally. Under these conditions, the output capacitor 30 will not be charged. When a signal is present of the phase such that the base leads of transistors 26 and 27 are driven negative during the active half cycle, the PNP transistor 26 is biased on and the NPN transistor 27 is biased off. The resulting unbalance causes the output capacitor 30 to charge positively. If the opposite phase is present at the base leads, transistor 27 will conduct more heavily, and the capacitor 30 will charge negatively. When the output of the last converter means applied to the phase sensitive detector 20, therefore, has the same phase as that of the carrier frequency source 23 the output of the multi-stage multiplier circuit will have one polarity while if the phases are different the output will have opposite polarity.

As shown in FIGURE 2, therefore, the two input, four-quadrant multiplier, illustrative of one embodiment of this invention, comprises first and second converter means 31 and 32 and a phase sensitive detector 21 connected in cascade relationship. A carrier frequency voltage source, shown schematically at 23 supplies an exciting carrier frequency signal to the primary winding 19 of first converter means 31. The first electrical signal to be multiplied is applied to terminal 15 of first converter means 31. The output of first converter means 31 is coupled to the primary winding 19 of the adjacent converter means 32. The output of converter means 31 is the product of the carrier frequency signal applied to winding 19 thereof and the direct current signal applied to input terminal 15. This output is utilized as the carrier frequency input to winding 19 of the second converter means 32. The second electrical input signal to be multiplied is applied to terminal 15 of the second converter means 32 and the output thereof coupled to the input of the phase sensitive detector 21 through resistance 22. The output at terminals 36–37 of the phase sensitive detector 21 represents the true product, including sign, of the two electrical signals applied to the input terminals 15 of converter means 31 and 32 respectively.

As shown by the foregoing description, phase sensitive detector 20 derives its reference carrier frequency signal voltage from the same source 23 as that of the carrier frequency signal to winding 19 of first converter means 31. Thus, it is operative to convert the output of second converter means 32 to a direct current voltage of the proper sign to indicate the product of the two input signals. For example, if the output of converter means 32 has the same phase as that of the carrier frequency signal applied to winding 19 of converter means 31, the output of phase sensitive detector 20 will be of one polarity. On the other hand, if the output of converter means 32 has the opposite phase from that of the carrier frequency signal applied to winding 19 of converter means 31 the output of phase sensitive detector 20 will be of opposite polarity. Thus, if both input signals to be multiplied are positive there will be no phase inversion of the output in either converter means 31 and 32 and the final output of phase sensitive detector 20 will have for example, positive polarity. Similarly, if both input signals are negative the outputs of both converter means 31 and 32 will have been inverted in phase. Thus, the resulting output of phase sensitive detector 20 will again be of positive polarity. On the other hand, if the input signals are of different polarity, then the output of only one converter means 31 or 32 will have been inverted in phase with respect to the carrier frequency signal applied to first converter means 31 and the output of the phase sensitive detector 20 will be of opposite, or negative, polarity. It is readily apparent, therefore, that the circuit of FIGURE 2 fully complies with the requirements for four-quadrant multiplication.

There has been described hereinbefore, therefore, a new four-quadrant multiplier which is inexpensive and which combines simple and rugged construction with accurate high speed and efficient operation.

While only preferred features of this invention have been shown by way of illustration, many modifications and changes will occur to those skilled in the art. It is, therefore, to be understood that the appended claims are intended to cover all such modifications and changes as fall within the true spirit and scope of this invention.

What I claim as new and desire to secure by Letters Patent of the United States is:

1. A four-quadrant multiplier comprising: a plurality of converter means each adapted to develop from a carrier frequency voltage and an input signal a carrier frequency output whose phase and amplitude are related respectively to the polarity and amplitude of said input signal; a source of carrier frequency voltage coupled to a first of said converter means for supplying carrier signal to said multiplier; means coupling said converter means one for each of a plurality of electrical signals to be multiplied in cascade relationship with respect to their carrier frequency paths so that the carrier frequency output of any one of said converter means provides the carrier frequency voltage to the following converter means; means applying each of said plurality of electrical signals to be multiplied as the input signal of each of said plurality of converter means, respectively; and means coupled to the carrier frequency output of the last of said converter means for developing an output whose polarity is determined by the phase and whose amplitude is proportional to the amplitude of said carrier frequency output.

2. A four-quadrant multiplier comprising: a plurality of converter means one for each of a plurality of electrical signals to be multiplied and each adapted to develop from a carrier frequency voltage and an input signal a carrier frequency output whose phase and amplitude are related respectively to the polarity and amplitude of said input signal; a source of carrier frequency voltage coupled to a first of said converter means for supplying carrier signal to said multiplier; a phase sensitive detector; means coupling said plurality of converter means and said phase sensitive detector in cascade relationship with respect to the carrier frequency signal so that the carrier frequency output of one converter means provides the carrier frequency voltage to the following converter means and the output of the last of said converter means provides the input to said phase sensitive detector; means applying each of the plurality of electrical signals to be multiplied as the input signal of each of said plurality of converter means, respectively; and means for taking an output from said phase sensitive detector representative of the product of said plurality of input signals including sign.

3. A four-quadrant multiplier comprising: a plurality of converter means one for each of a plurality of electrical signals to be multiplied and each adapted to develop from a carrier frequency voltage and a direct current input signal a carrier frequency output whose phase and amplitude are related respectively to the polarity and amplitude of said direct current input signal; a source of carrier frequency voltage coupled to a first of said converter means for supplying carrier signal to said multiplier; means coupling said plurality of converter means in cascade relationship with respect to said carrier frequency signal so that the carrier frequency output of one converter means provides the carrier frequency voltage of the following converter means; means for applying each of a plurality of electrical direct current signals to be multiplied to the input of each of said converter means respectively so that the carrier frequency output of each converter means is related in phase with respect to the carrier frequency voltage applied thereto to the polarity of the direct current input signal; and means for converting the carrier frequency output of the last of said cascade connected converter means to a direct current voltage whose polarity is determined by the phase of said output with respect to the phase of the carrier frequency voltage applied to the first of said cascaded converter means.

4. The four-quadrant multiplier of claim 3 wherein the means for converting the carrier frequency output of the last cascade connected converter means is a phase sensitive detector whose reference voltage is derived from the same source as that of the carrier frequency voltage applied to the first of said cascaded converter means.

5. The four-quadrant multiplier of claim 3 wherein each of said converter means comprises a pair of nonlinear circuit elements connected in series relationship; means coupled to said nonlinear elements establishing operating conditions therefor so that said elements exhibit substantially the same impedances; means for applying a carrier frequency voltage and deriving therefrom equal and opposite carrier frequency voltages; means associated with said means for deriving said equal and opposite voltages for applying same to said nonlinear elements so that said elements are rendered conducting; input means for applying an electrical signal to the common junction between said nonlinear elements rendering one of said elements more conducting than the other to develop a carrier frequency output whose amplitude is proportional to said input signal and whose phase with respect to the phase of the applied carrier frequency voltage is determined by the polarity of said input signal and carrier frequency output means coupled to said common junction.

6. The four-quadrant multiplier of claim 5 wherein the nonlinear elements in each of said converter means have matched electrical characteristics.

7. The four-quadrant multiplier of claim 5 wherein the nonlinear elements are semiconductor diode devices.

References Cited by the Examiner

UNITED STATES PATENTS

| | | | |
|---|---|---|---|
| 2,519,223 | 8/1950 | Cheek | 235—194 |
| 2,700,135 | 1/1955 | Tolles | 235—194 |
| 2,905,896 | 9/1959 | Kamp | 332—47 |
| 2,921,739 | 1/1960 | Tolles | 235—194 |
| 3,012,201 | 12/1961 | Morphett | 328—133 X |
| 3,110,819 | 11/1963 | Helms | 328—150 X |
| 3,162,773 | 12/1964 | Jansons | 328—133 X |

MALCOLM A. MORRISON, *Primary Examiner.*